(12) United States Patent
Griffin

(10) Patent No.: US 6,357,217 B1
(45) Date of Patent: Mar. 19, 2002

(54) ENDOTHERMIC COOLING OF GUIDE VANES AND/OR MOVING BLADES IN A GAS TURBINE

(75) Inventor: Timothy Griffin, Ennetbaden (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/625,044

(22) Filed: Jul. 24, 2000

(30) Foreign Application Priority Data

Jul. 26, 1999 (DE) .......................................... 199 34 927

(51) Int. Cl.⁷ ............................... F02C 3/22; F02C 3/30
(52) U.S. Cl. ...................... 60/39.05; 60/39.12; 60/39.75
(58) Field of Search ............................. 60/39.02, 39.05, 60/39.12, 39.465, 39.53, 39.75

(56) References Cited

U.S. PATENT DOCUMENTS 3,067,594 A * 12/1962 Bland et al. ................... 60/267
5,705,916 A * 1/1998 Rudbeck et al. ............ 60/39.12
5,826,422 A * 10/1998 Koyama ..................... 60/39.12

FOREIGN PATENT DOCUMENTS

DE 19716721 A1 11/1998
EP 0684367 A1 11/1995

* cited by examiner

Primary Examiner—Louis J. Casaregola
(74) Attorney, Agent, or Firm—Burns, Doane, Swecker & Mathis, L.L.P.

(57) ABSTRACT

In a method for the cooling of guide vanes and/or moving blades in the turbine stages of a gas turbine plant, a cooling medium, which contains a first fuel, is fed through the interior of the guide vanes and/or moving blades to be cooled and, using a catalyst, undergoes an endothermal chemical process therein in which the first fuel is converted at least partially into a second fuel. The cooling medium containing the second fuel is used as fuel for driving the gas turbine plant after the cooling medium has flowed out of the guide vanes and/or moving blades. In such a method, a high effectiveness of the cyclic process is highly effective and the cooling of the vanes/blades is simultaneously improved. The first fuel is a methane-containing gas, in particular natural gas, and a mixture of the first fuel with steam is used as the cooling medium and leads to a reforming of the methane in the endothermal chemical process.

14 Claims, 3 Drawing Sheets

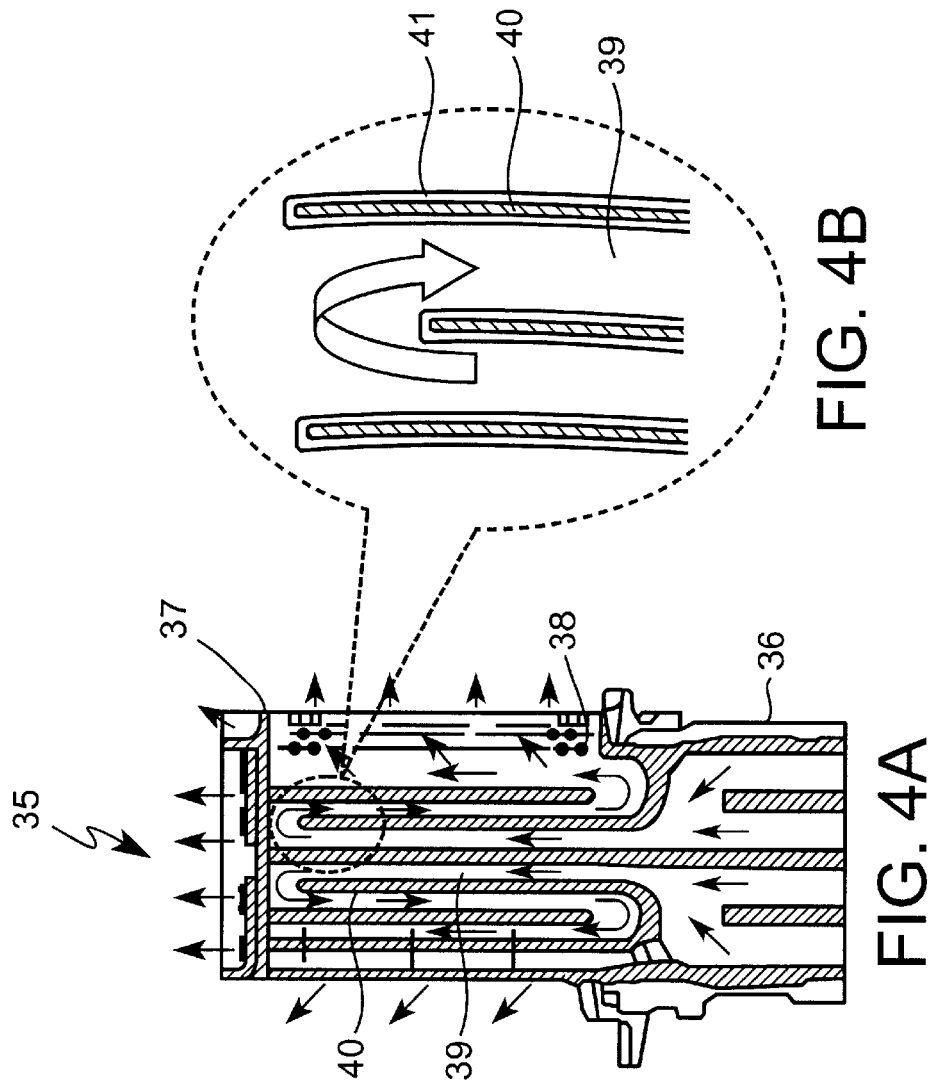
FIG. 4A
FIG. 4B
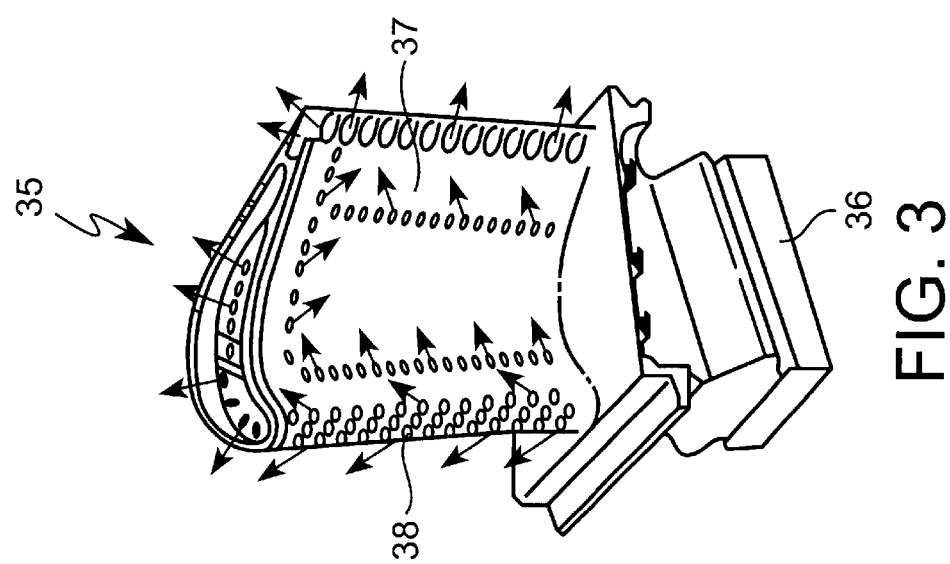
FIG. 3

ENDOTHERMIC COOLING OF GUIDE VANES AND/OR MOVING BLADES IN A GAS TURBINE

FIELD OF THE INVENTION

The present invention relates to the field of gas turbines. More specifically, the present invention is concerned with a method for the cooling of guide vanes and/or moving blades in the turbine stages of a gas turbine plant, in which a cooling medium, which contains a first fuel, is fed through the interior of the guide vanes and/or moving blades to be cooled and, using a catalyst, undergoes an endothermal chemical process therein in which the first fuel is converted at least partially into a second fuel, and in which the cooling medium containing the second fuel, after flowing out of the guide vanes and/or moving blades, is used as fuel for driving the gas turbine plant.

BACKGROUND OF THE INVENTION

Such a method is known, for example, from the publication U.S. Pat. No. 5,125,793. In the known method, an endothermal fuel for cooling is fed through the cooling ducts of a gas turbine moving blade, which are lined with a catalyst layer, and is simultaneously evaporated therein and decomposed into a plurality of partially combustible components.

Continuing developments in gas turbines make it possible to increase the turbine inlet temperatures to ever higher values, with the result that, in theory, higher efficiencies can be achieved in the basic cyclic process. However, these increases are associated with the following two problems:

1. How can the vanes/blades of the gas turbine, particularly in the entry stages where the gas temperatures exceed 800° C., be cooled effectively without the excessive use of cooling air?
2. How can the ever increasing turbine outlet temperatures of up to 700° C. be handled due to material-related restrictions, the steam temperature in combined cycle plants cannot be superheated to much more than 550° C. It is therefore not possible for the steam generator to utilize all the possible exergy of the turbine exhaust gases.

It has already been proposed in the past (see, for example, U.S. Pat. No. 5,795,130) to cool gas turbine vanes/blades, particularly in combined cycle power stations, by means of steam, instead of by compressed air, in order to increase both the efficiency in the cyclic process and cooling effectiveness. Both the moving blades and the guide vanes are in this case steam-cooled. The steam is extracted from the steam turbine at high pressure and is supplied to it again at lower pressure.

It has also been proposed (U.S. Pat. No. 5,896,738), in an otherwise conventionally cooled gas turbine, to make use, by thermochemical recuperation, of part of the energy contained in the turbine exhaust gases in order to reform a gaseous fuel which is mixed with steam and which is then supplied as fuel to the combustion chamber of the gas turbine. Another proposal (U.S. Pat. No. 5,431,007) relates to a comparable use of a reformed fuel in a steam-cooled gas turbine.

U.S. Pat. No. 5,590,518 proposes, in a gas turbine with thermochemical recuperation, to cool the last turbine stage of the gas turbine by means of the steam/fuel mixture either before reforming (FIG. 4) or after reforming (FIG. 3). Reforming, in this case, is carried out in an external reformer.

Finally, in U.S. Pat. No. 5,125,793 mentioned hereinabove, an endothermal liquid fuel, for example standard kerosene JP7, is used for cooling the vanes/blades of a gas turbine (without the use of steam and without reforming). The fuel is fed through cooling ducts in the vanes/blades, the ducts being coated with a catalyst layer, and is simultaneously evaporated therein and decomposed catalytically into various components, so that the evaporation heat and the energy consumption of the endothermal decomposition reaction are used at the same time for cooling.

The known cooling methods have various disadvantages: in the cooling method with external reforming, an external reformer with corresponding line connections is required, thus entailing a considerable additional outlay in terms of apparatus and space. Cooling by means of an endothermal fuel, such as is described in the last-mentioned publication, is restricted to gas turbine plants which are operated with a special liquid fuel, while the gas turbine plants in combined cycle power stations are normally operated with natural gas (NG).

SUMMARY OF THE INVENTION

The object of the invention, therefore, is to specify a cooling method for gas turbines and a gas turbine plant which avoid the disadvantages of known cooling methods and, in particular, bring about highly effective cooling of the turbine vanes/blades in a space-saving way and at little outlay in terms of apparatus, along with an optimal utilization of the energy employed.

The essence of the invention is to use, at least partially, a reformed fuel for the gas turbine, the endothermal reforming of the steam/fuel mixture (steam methane) taking place catalytically in the vanes/blades to be cooled (cooling ducts) of the gas turbine itself.

A preferred embodiment of the method according to the invention which is distinguished by a particular simplicity includes cooling ducts provided in the interior of the guide vanes and/or moving blades to be cooled. The cooling ducts are delimited by walls covered with a catalyst layer and the cooling medium is fed through the cooling ducts.

Preferably, in this case, the reforming of the methane in the guide vanes and/or moving blades is carried out at temperatures of between 600 and 800° C. and at pressures of between 10 and 30 bar, and a ratio of steam to methane of 3:1 to 4:1 on a molar basis prevails in the cooling medium before inflow into the guide vanes and/or moving blades.

In a further preferred embodiment of the method according to the invention the cooling medium, flows out through corresponding outflow orifices, at least partially, directly into the respective turbine stage of the gas turbine plant after running through the reforming process in the respective guide vane and/or moving blade. The hot gases flowing through the turbine thereby undergo intermediate heating (reheating) which increases the effectiveness thereof.

In an embodiment which is an alternative to the above, the cooling medium, after running is used at least partially as fuel in a combustion chamber of the gas turbine plant after running through the reforming process in the respective guide vane and/or moving blade. Here too, the chemical energy of the reformed fuel is returned into the cyclic process of the gas turbine. In both instances, the thermal energy of the hot turbine exhaust gases is utilized even more effectively as a result of the so-called "chemical recuperation". At the same time, it is perfectly possible for the reformed cooling medium not to be used exclusively, but as an additive to a further fuel in the combustion chamber of the gas turbine plant.

If the reforming of the fuel in the turbine blades is not complete, it may be advantageous if, according to another preferred embodiment of the invention, in each case, part of the cooling medium, is branched off and is added again to the cooling medium to be reformed after running through the reforming process.

In the gas turbine plant according to the invention for carrying out the method, the gas turbine plant includes one or more turbine stages, in which a multiplicity of guide vanes and/or moving blades are arranged in various vane/blade arrangements. The turbine plant also includes interior cooling ducts having catalytic properties. The cooling ducts are connected to a steam source through a cooling line, and the cooling line has a fuel feed for introducing the first fuel into the cooling line.

In a preferred embodiment of the gas turbine plant according to the invention, the cooling ducts are delimited by walls which are covered with catalyst layers.

The reformed fuel is introduced into the gas turbine either by virtue of the provision of outflow orifices on the guide vanes and/or moving blades cooled by the cooling medium, through which outflow orifices the cooling medium can flow out of the guide vanes and/or moving blades after running through the cooling ducts, or by virtue of the presence of fuel lines, through which the cooling medium, after running through the cooling ducts, is supplied to a combustion chamber of the gas turbine plant.

BRIEF DESCRIPTION OF THE DRAWINGS

The invention will be explained in more detail below with reference to exemplary embodiments, together with the drawing in which:

FIG. 3 shows a perspective side view of a turbine vane/blade, such as is suitable for a method according to FIG. 1; and FIG. 4 shows the turbine vane/blade from FIG. 3 in longitudinal section (FIG. 4A) and the walls of the cooling ducts from FIG. 4A as an enlarged detail (FIG. 4B).

DETAILED DESCRIPTION OF THE INVENTION

Figure 1:
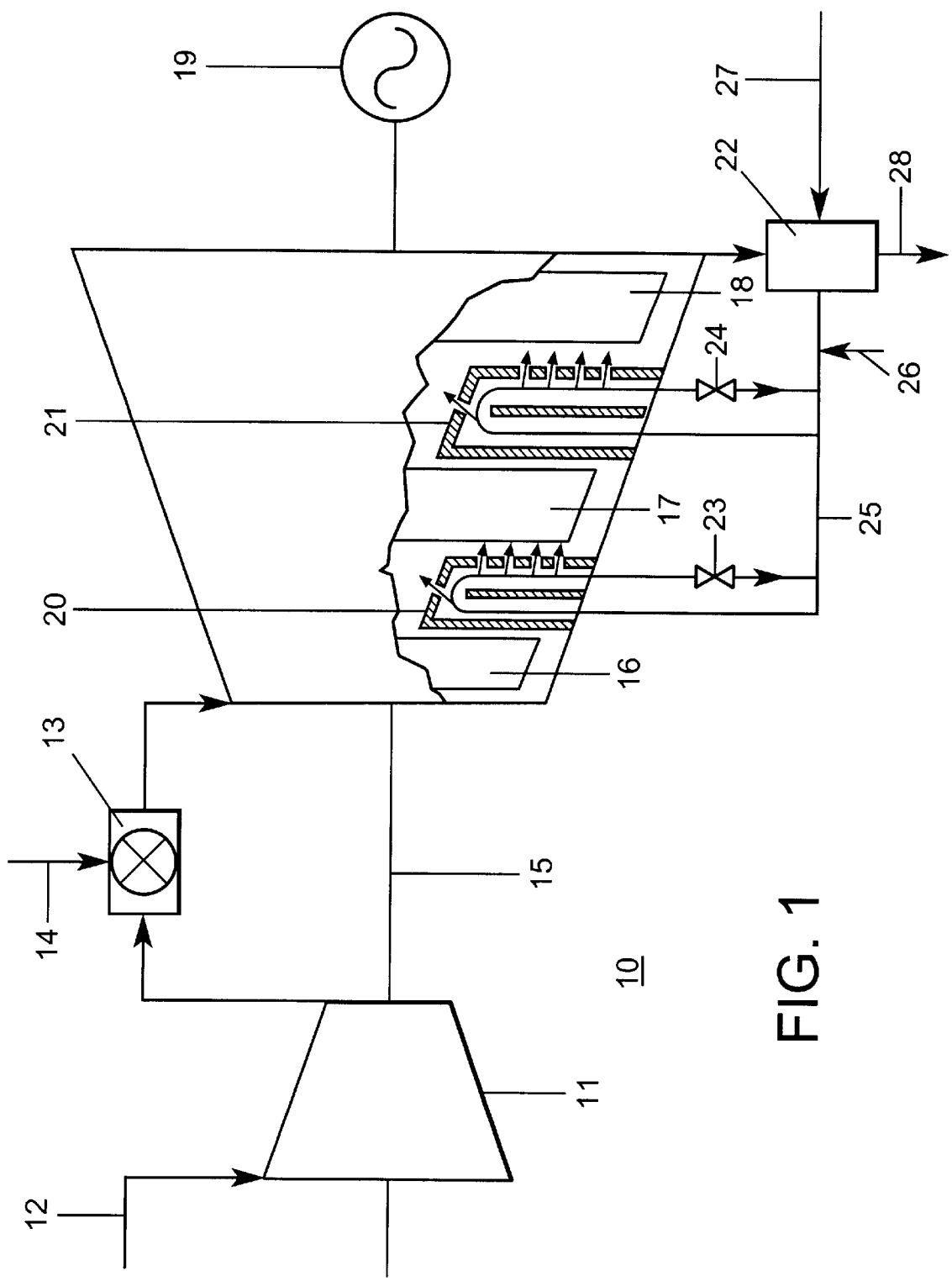
FIG. 1 shows a diagrammatic illustration of a method according to a first exemplary embodiment of the invention, with the direct feed of the reformed fuel into the turbine stages of the gas turbine.

According to the present invention, it is proposed to mix fuel in the form of natural gas (NG) with steam. In this mixture, catalytic endothermal steam reforming reactions is carried out on the inner heat transmission surfaces of the cooling ducts in the turbine vanes/blades.

This is done, in order simultaneously to improve cooling, as compared with straightforward steam cooling, and to generate a stream of synthesis gas which is then used again for driving the gas turbine. The cooling of the surfaces of the turbine can thereby be improved dramatically. This type of cooling may be carried out in the first turbine stage, in the guide vanes of the turbine nozzle and in the subsequent turbine vanes/blades. According to FIGS. 3 and 4, the vanes/blades 35, which comprise a leaf 37 and a foot 36, have for this purpose, in their interior, cooling ducts 39 which are delimited by walls 40. A catalyst layer 41 on these walls 40 brings about the catalytic reforming reaction of the steam/fuel mixture led through the cooling ducts 39.

The endothermal reaction takes place readily under the typical conditions prevailing in the cooling ducts of the gas turbine vanes/blades, specifically at temperatures of between 600° C. and 800° C. and at pressures of between 10 and 30 bar, to be precise with the following reaction stoichiometry:

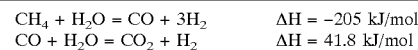

| | |
|---|---|
| $CH_4 + H_2O = CO + 3H_2$ | $\Delta H = -205$ kJ/mol |
| $CO + H_2O = CO_2 + H_2$ | $\Delta H = 41.8$ kJ/mol |

The entire process is endothermal and removes energy from the metal surfaces of the turbine vanes/blades. In commercial steam reformers, the steam/methane mixture is maintained at a ratio of 3:1 to 4:1 on a molar basis and the inlet temperature of the mixture is approximately 500° C., while the outlet temperature is between 800° C. and 850° C.

Figure 2:
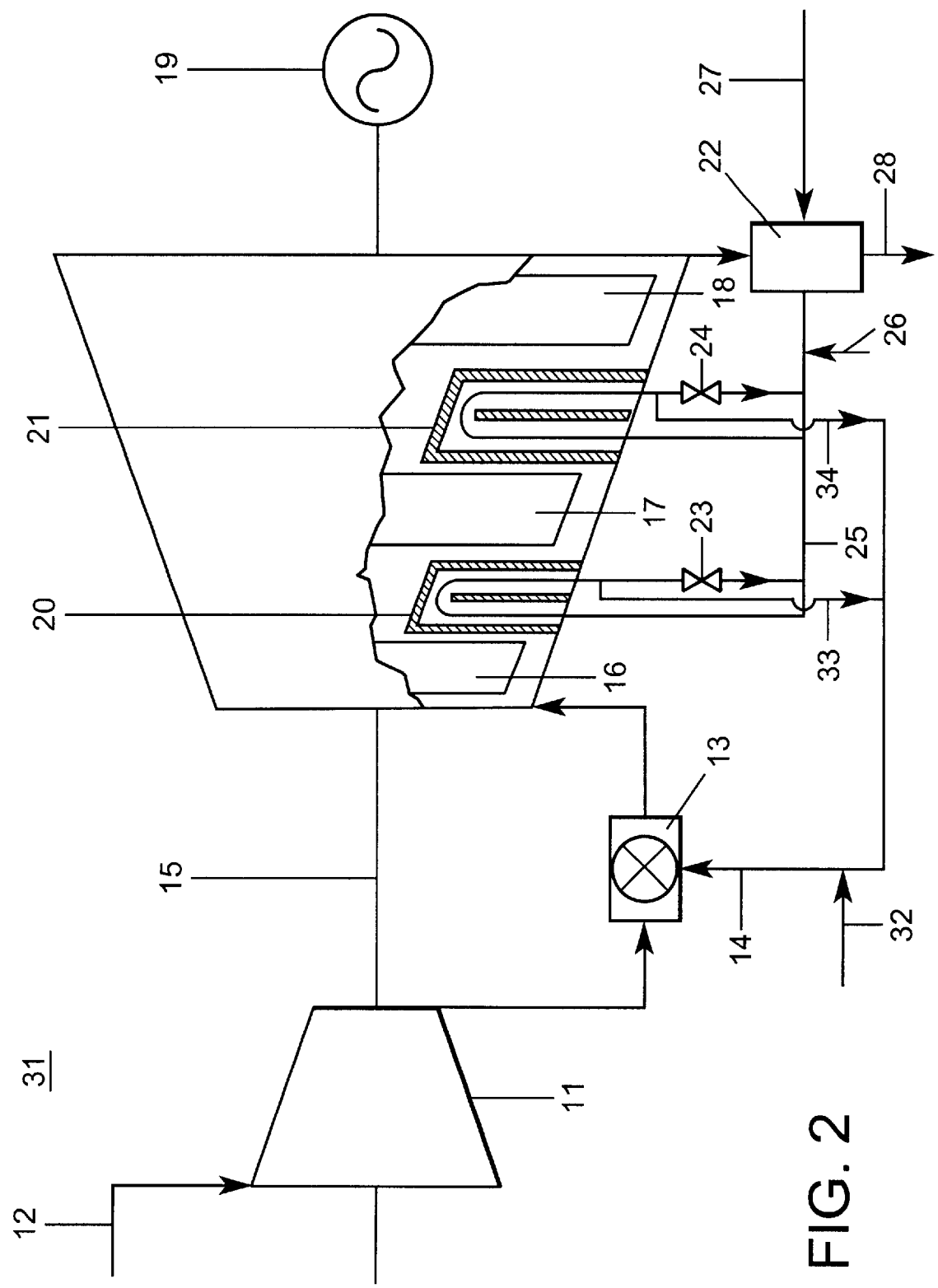
FIG. 2 shows a diagrammatic illustration of a method according to a second exemplary embodiment of the invention, with the feed of the reformed fuel into the combustion chamber of the gas turbine.

The steam-diluted synthesis gas occurring during reforming can be used, then, in two different ways according to FIGS. 1 and 2, in order to make the recuperated energy capable of being utilized again for the gas turbine process:

1. Direct Injection into the Turbine (Steam Injection Gas Turbine STIG with Intermediate Heating) According to FIG. 1

The gas can be injected into the flow of the gas turbine, in order to release the additional chemical energy. This gives rise to intermediate heating (reheat) and to a corresponding increase in the efficiency and in the initial power output. The accompanying process is reproduced diagrammatically in FIG. 1. In this case, the gas turbine plant 10 conventionally includes a compressor 11 with an associated air inlet 12 for sucking in and compressing combustion air, a combustion chamber 13 with a fuel supply 14, in which combustion chamber the fuel is burnt by the addition of the compressed combustion air, and one or more turbine stages 16, ..., 18, through which the hot combustion gases are led from the combustion chamber 13 and drive the gas turbine. The compressor 11, turbine stages 16, ..., 18 and an electric generator 19 are seated on a common shaft 15.

FIG. 1 depicts the vane/blade arrangements 20 and 21 which are equipped with the catalyst-fitted cooling ducts and which act as reforming heat exchangers. Hot gases flow around the vanes/blades 20, 21 in the turbine duct to be cooled. The cooling ducts within the vanes/blades carry the cooling steam/fuel mixture to be reformed. Heat transmission through the outer walls of the vanes/blades takes place in the manner of a heat exchanger between the cooling ducts and the turbine duct.

The turbine ducts around the vane/blade arrangements 20, 21 are connected correspondingly to the turbine stages 16, ..., 18 through which hot gas flows. The cooling ducts have flowing through them the mixture of steam and of methane-containing fuel, the mixture being delivered through a cooling line 25. In this case, the steam comes from an evaporator 22, through which flow the hot exhaust gases flowing out from the last turbine stage 18 at an exhaust gas outlet 28 and which converts the water supplied through a water supply 27 into steam. The fuel to be reformed is then admixed in the cooling line 25, by means of a fuel feed 26, with the steam flowing out of the evaporator 22. The steam/fuel mixture is converted catalytically when it flows through the cooling ducts in the vane/blade arrangements 20, 21, and the water-containing steam/fuel mixture which occurs is fed directly into the following turbine stages 17, 18 through the outflow orifices 38 in FIGS. 3 and 4. If catalytic conversion during one pass through the cooling ducts is incomplete, part of the outflowing mixture may be returned to the cooling line 25 again through valves 23, 24 and thus be supplied anew to the reforming process.

As already mentioned above, the reformed cooling medium can be injected directly through corresponding outflow orifices 38 in the vanes/blades. It is also just as possible, however, for the reformed cooling medium to be collected centrally and to be injected into the turbine by means of separate injection devices. The action of the injection of additional fuel on the efficiency is described in a similar way to the publication DE-C1-41 40 653, where, instead of air, methane was used for the cooling of compressor vanes/blades and was subsequently injected into the turbine stream. The injected methane was then oxidized by means of catalysts arranged between the compressor and the turbine. Calculations which were carried out showed that, by the injection of an additional 15–20% of fuel, it was possible to increase the efficiency in the combined cycle process by up to 3.1% (or from 48.1% to 51.5% in the plant as a whole). In the present invention, however, in contrast to this, no catalysts are required for oxidizing the injected reactive cooling medium, because, here, the reformed cooling medium contains highly reactive hydrogen. Moreover, the endothermal reforming reaction in the turbine vanes/blades, such as takes place within the scope of the invention, leads to markedly more effective cooling of the vanes/blades.

2. Use of the Reformed Gaseous Fuel as Fuel for the Combustion Chamber of the Gas Turbine According to FIG. 2

The reformed gas can also be used, in a gas turbine plant 31 according to FIG. 2, as the main fuel or as an additive to the main fuel for the combustion chamber 13 of the plant. In this case, the cooling ducts of the vane/blade arrangements 20 and 21 are connected through fuel lines 33 and 34 to the fuel supply 14 of the combustion chamber 13. If the reformed fuel is to be used only as an additive to the main fuel, an additional fuel feed 32 is provided, by means of which the main fuel (natural gas or the like) is fed into the fuel supply 14. In this case, too, the overall efficiency is markedly improved by the addition of the reformed fuel, as compared with the simple combined cycle process, the cooling of the vanes/blades additionally being improved dramatically. As in the exemplary embodiment of FIG. 1, here too, part of the mixture flowing out of the cooling ducts vane/blade arrangements 20, 21 may be fed back into the cooling line through corresponding valves 23, 24.

An additional advantage is afforded by the high reactivity of the reformed hydrogen-containing fuel. As a result, the inflammability limits of the combustion process are widened and combustion-related instabilities (pulsations, etc.) are reduced. Furthermore, the reformed fuel also greatly assists in igniting and maintaining a catalyst-stabilized thermal combustion, because the addition- of hydrogen markedly lowers the catalytic ignition temperature of natural gas.

It is, of course, also possible, within the scope of the invention, to provide mixed forms of the two process variants described above, that is to say to use the reformed gas both as an additive to the main fuel and for direct injection into the turbine stream.

Although this invention has been illustrated and described in accordance with certain preferred embodiments, it is recognized that the scope of this invention is to be determined by the following claims.

What is claimed is:

1. A method for the cooling of guide vanes and/or moving blades in turbine stages of a gas turbine plant, comprising the steps of:

feeding a cooling medium, which contains a first fuel, through an interior of the guide vanes and/or moving blades to be cooled, said cooling medium undergoing an endothermal chemical process with the use of a catalyst in said interior, in which the first fuel is converted at least partially into a second fuel;

using at least a first portion of the cooling medium containing the second fuel as fuel for driving the gas turbine plant after said cooling medium containing the second fuel has flowed out of the guide vanes and/or moving blades;

wherein the first fuel is a methane-containing gas and the cooling medium is a mixture of the first fuel and steam which leads to a reforming of the methane in the endothermal chemical process; and directing a second portion of the cooling medium that has flowed out of the guide vanes and/or moving blades back through the interior of the guide vanes and/or moving blades to undergo an endothermal chemical process.

2. The method as claimed in claim 1, further comprising the steps of:

providing cooling ducts which are delimited by walls covered with a catalyst layer in the interior of the guide vanes and/or moving blades to be cooled; and feeding the cooling medium through the cooling ducts.

3. The method as claimed in claim 1, further comprising the step of:

carrying out the reforming of the methane in the guide vanes and/or moving blades at temperatures of between 600 and 800° C. and at pressures of between 10 and 30 bar.

4. The method as claimed in claim 1, further comprising the step of:

making a ratio of steam to methane approximately equal to 3:1 to 4:1 on a molar basis prevalent in the cooling medium before inflow thereof into the guide vanes and/or moving blades.

5. The method as claimed in claim 1, wherein the cooling medium flows out through corresponding outflow orifices, at least partially, directly into the respective turbine stage of the gas turbine plant after the cooling medium has run through the reforming process in the respective guide vane and/or moving blade.

6. The method as claimed in claim 1, further comprising the step of:

using the cooling medium, at least partially, as fuel in a combustion chamber of the gas turbine plant after the cooling medium has run through the reforming process in the respective guide vane and/or moving blade.

7. The method as claimed in claim 6, further comprising the step of:

using the reformed cooling medium as an additive to a further fuel in the combustion chamber of the gas turbine plant.

8. A gas turbine plant for carrying out the method as claimed in claim 1, said gas turbine plant comprising:

one or more turbine stages;

a plurality of guide vanes and/or moving blades arranged in various vane/blade arrangements;

said guide vanes and/or moving blades having cooling ducts in interiors thereof, said cooling ducts having catalytic properties; and said cooling ducts being connected to a steam source through a cooling line, the cooling line having a fuel feed for introducing the first fuel into the cooling line.

9. The gas turbine plant as claimed in claim 8, wherein the steam source is an evaporator through which the hot exhaust gases from the gas turbine plant flow and which converts water supplied by means of a water supply into steam.

10. The gas turbine plant as claimed in claim 8, wherein the cooling ducts are delimited by walls which are covered with catalyst layers.

11. The gas turbine plant as claimed in claim 8, further comprising:
   outflow orifices provided on the guide vanes and/or moving blades cooled by the cooling medium; and
   the cooling medium being capable of flowing out of the guide vanes and/or moving blades through the outflow orifices after said cooling medium has run through the cooling ducts.

12. The gas turbine plant as claimed in claim 8, further comprising:
   a plurality of fuel lines through which the cooling medium is supplied to a combustion chamber of
   the gas turbine plant after said cooling medium has run through the cooling ducts.

13. The method as claimed in claim 1, wherein said first fuel is a natural gas.

14. The gas turbine plant as claimed in claim 8, further comprising at least one connection located downstream of the guide vanes and/or moving blades to direct a portion of the cooling medium that has flowed out of the guide vanes and/or moving blades back through the guide vanes and/or moving blades.

* * * * *